United States Patent
Wahl et al.

(10) Patent No.: US 7,882,474 B2
(45) Date of Patent: Feb. 1, 2011

(54) TESTING PHASE ERROR OF MULTIPLE ON-DIE CLOCKS

(75) Inventors: Mark A. Wahl, Windsor, CO (US); Aaron M. Volz, Fort Collins, CO (US); Krista R. Dorner, Loveland, CO (US)

(73) Assignee: Avago Technologies Enterprise IP (Singapore) Pte. Ltd., Singapore (SG)

( * ) Notice: Subject to any disclaimer, the term of this patent is extended or adjusted under 35 U.S.C. 154(b) by 332 days.

(21) Appl. No.: 12/049,645

(22) Filed: Mar. 17, 2008

(65) Prior Publication Data

US 2009/0235218 A1 Sep. 17, 2009

(51) Int. Cl.
*G06F 17/50* (2006.01)
*H03L 7/00* (2006.01)

(52) U.S. Cl. ............... 716/6; 716/1; 716/2; 716/4; 716/5; 327/141; 327/144

(58) Field of Classification Search ............ 716/1, 716/4, 6; 324/622; 375/330, 332, 354, 371; 327/141, 144
See application file for complete search history.

(56) References Cited

U.S. PATENT DOCUMENTS

| | | | |
|---|---|---|---|
| 6,737,896 B2 * | 5/2004 | Yoshioka | 327/144 |
| 7,003,066 B1 * | 2/2006 | Davies et al. | 375/376 |
| 7,151,379 B2 * | 12/2006 | Christensen | 324/620 |
| 7,190,754 B1 * | 3/2007 | Chang et al. | 375/373 |
| 7,333,570 B2 * | 2/2008 | Aung et al. | 375/326 |
| 7,480,765 B2 * | 1/2009 | Matsushige et al. | 711/114 |
| 7,668,271 B2 * | 2/2010 | Kim et al. | 375/354 |
| 2005/0108600 A1 * | 5/2005 | Arguelles | 714/701 |
| 2007/0047589 A1 * | 3/2007 | Modaress-Razavi et al. | 370/503 |
| 2010/0011240 A1 * | 1/2010 | Landolt | 714/10 |

* cited by examiner

*Primary Examiner*—Helen Rossoshek

(57) ABSTRACT

The phase relationship between two clock signals in an integrated circuit (IC) is determined by transforming each of the clock signals into a data word, where bit transitions in the data word represent signal transitions in the clock signal, and comparing the two data words. For example, in an IC having a de-serializer as part of its input/output logic, the clocks are sequentially multiplexed into the de-serializer, which transforms the clocks into parallel-format data words. The resulting words corresponding to the first and second clock signals can then be compared to determine clock signal transition differences and thus the phase relationship between the corresponding clocks signals.

3 Claims, 4 Drawing Sheets

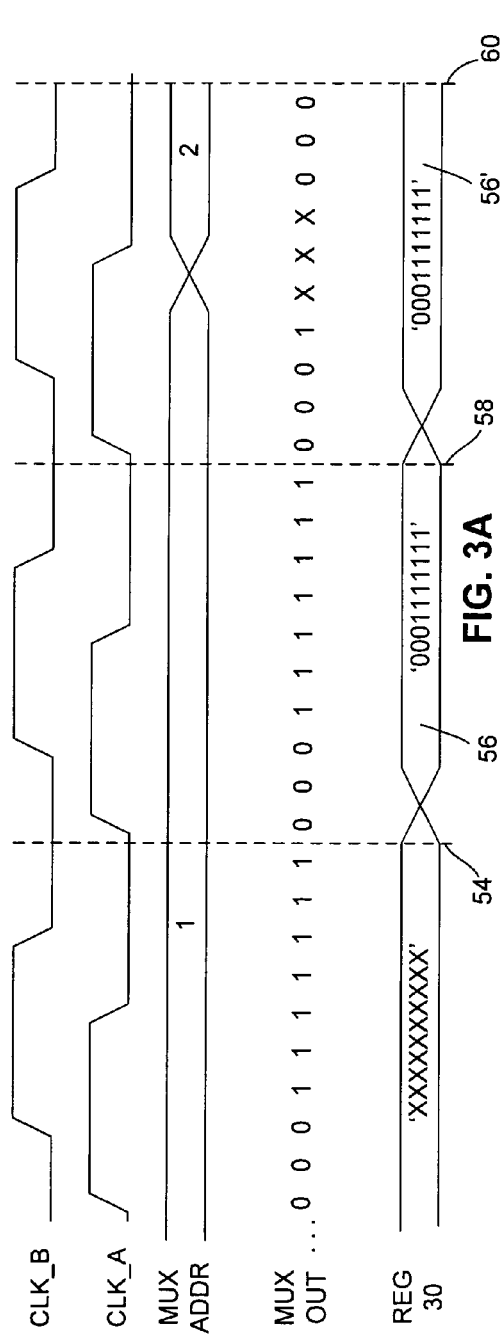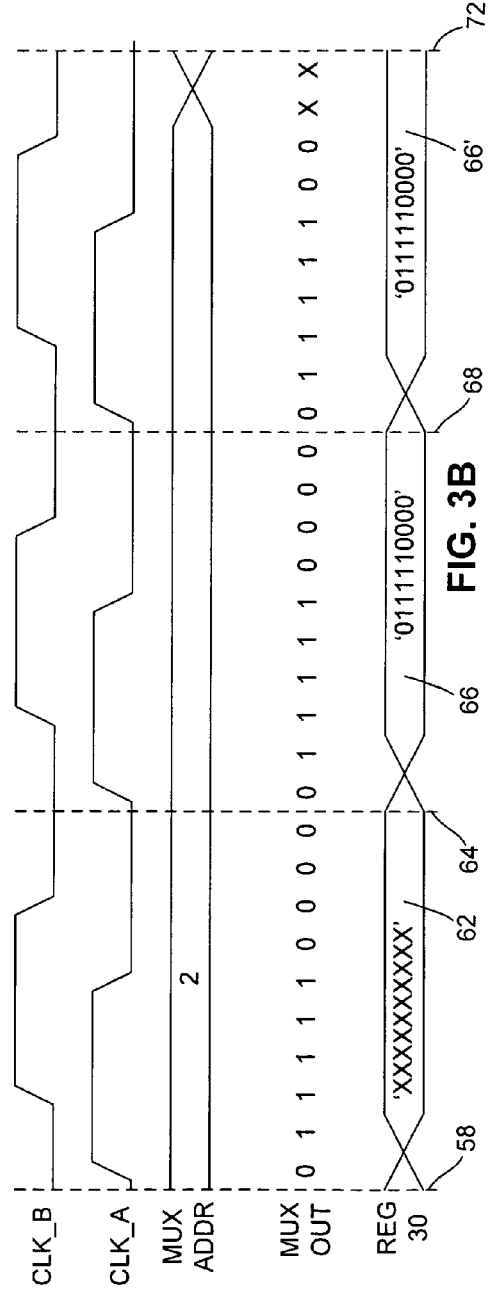

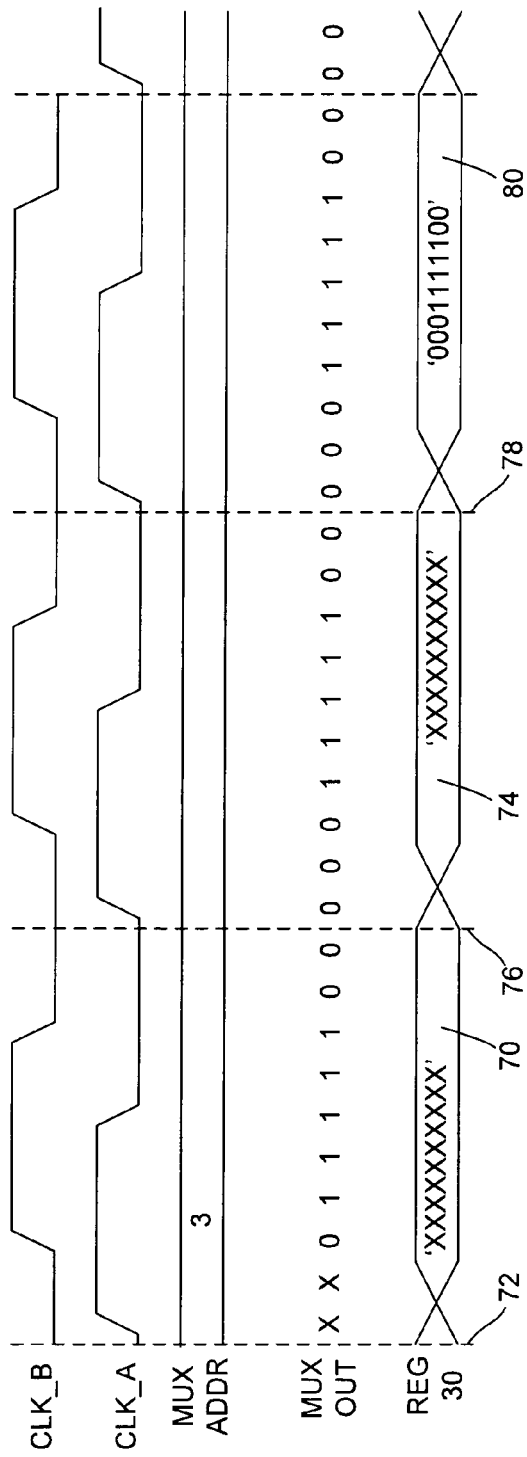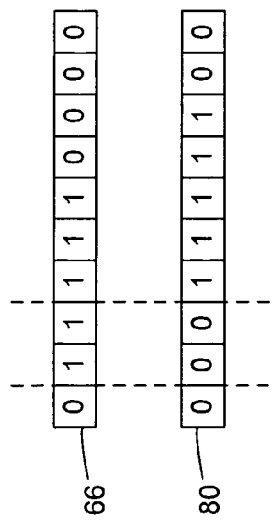

TESTING PHASE ERROR OF MULTIPLE ON-DIE CLOCKS

BACKGROUND

In digital electronic circuitry, it is common to transfer data from one clock domain to another. Data is clocked out of a register by the first domain clock, and clocked into a register by the second domain clock. Generally, the two clocks are synchronous. That is, their phase relationship is constant. In such instances, the major problem in ensuring proper data transfer from one domain to the other is ensuring that the phase relationship is within a range that allows the data to meet setup and hold timing requirements.

Persons involved in the design and manufacture of integrated circuits (ICs), especially application-specific ICs (ASIC), desire to verify that data can be properly transferred between two clock domains in the IC die. For example, in many ASICs, data is transferred between "core" logic in one region of the IC die and input/output (I/O) logic in another region of the IC die. The I/O logic can include, for example, a Serializer/De-serializer or "SerDes." In the prior art, proper data transfer between core logic and a SerDes has been verified in tests by transferring large amounts of test data between the core logic and SerDes and comparing the input data with the output data. Although this method can indicate that the ASIC is generally operational for its intended purpose, it does not necessarily prove that the ASIC has been designed and manufactured in a manner that meets clock phase specifications, since it is possible for a data transfer to be successful despite the two clocks having a phase relationship somewhat outside of the designed-for, i.e., specified, range.

SUMMARY

The phase relationship between two clock signals in an integrated circuit (IC) is determined by transforming each of the clock signals into a data word, where bit transitions in the data word represent signal transitions in the clock signal, and comparing the two data words. For example, in an IC having a de-serializer as part of its input/output logic, the clocks can be sequentially multiplexed into the de-serializer, which transforms the clocks into parallel-format data words. The resulting words corresponding to the first and second clock signals can then be compared to determine clock signal transition differences and thus the phase relationship between the corresponding clocks signals. In some exemplary embodiments of the invention, the de-serializer can be included as part of a Serializer/De-Serializer (SerDes).

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

FIG. 3A is timing diagram illustrating operation of the clock phase testing in the integrated circuit of FIG. 1.

FIG. 3B is a continuation of FIG. 3A.

FIG. 3C is a continuation of FIG. 3B.

FIG. 4 is a diagram illustrating a comparison between two data words representing clock signals.

DETAILED DESCRIPTION

Figure 1:
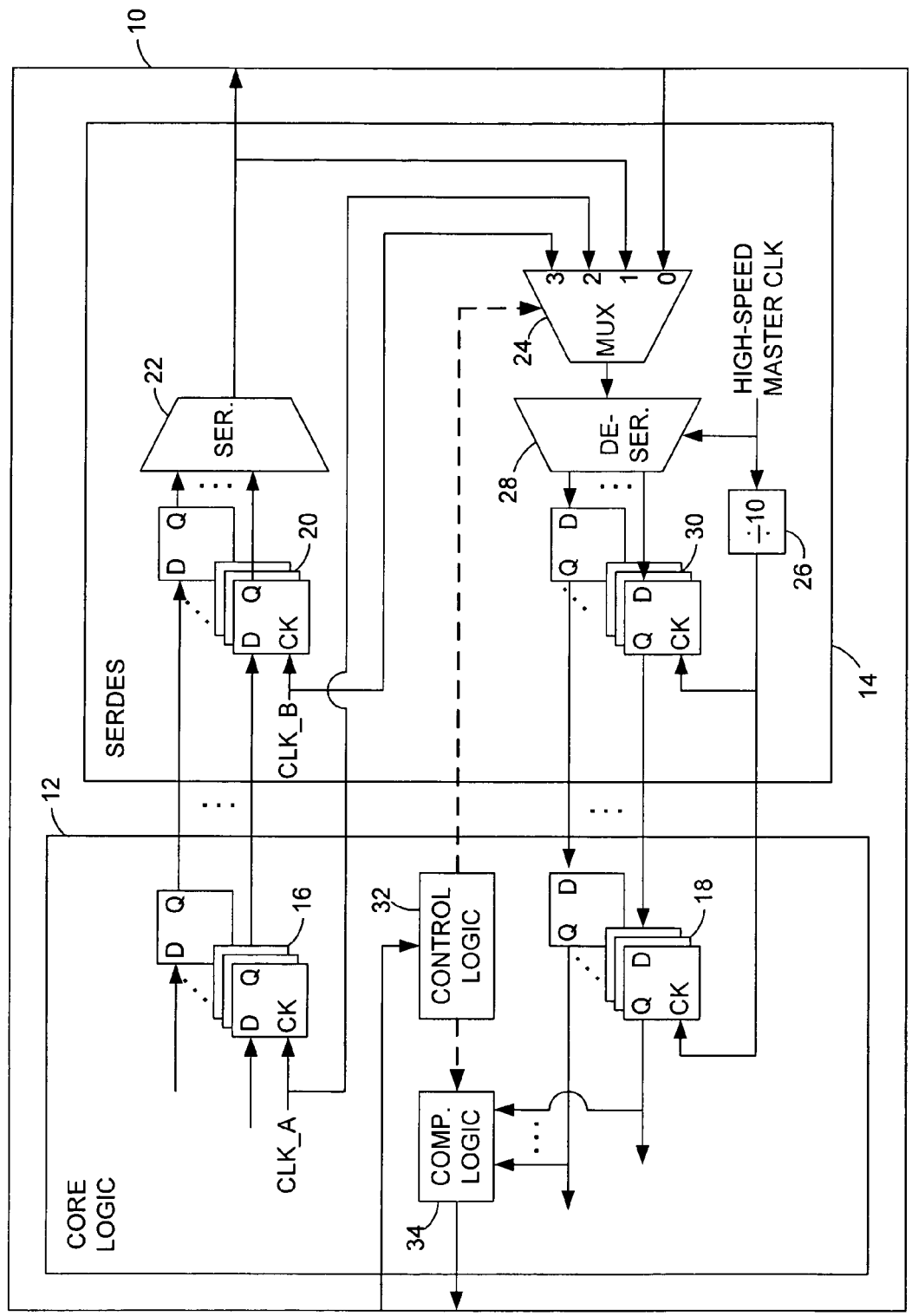
FIG. 1 is a block diagram of an integrated circuit having one or more Serializer/De-serializers (SerDes).

As illustrated in FIG. 1, in one exemplary embodiment of the invention, an integrated circuit (IC) 10, such as an application-specific integrated circuit (ASIC), includes core logic 12 and one or more Serializer/De-serializers (SerDes) 14. SerDes 14, which is part of the overall input/output (I/O) logic of IC 10, is a high-speed device for efficiently inputting and outputting data to and from IC 10 through associated I/O pads (not shown for purposes of clarity). As known in the art, SerDes 14 comprises logic that converts data that exists inside the IC (e.g., in core logic 12) in parallel form into a serial bit stream for output from the IC, and converts a serial bit stream input to the IC into parallel form for use inside the IC. Core logic 12 operates primarily under a first clock signal ("CLK_A"), while the serializer portion of SerDes 14 that receives data from core logic 12 operates primarily under a second clock signal ("CLK_B"). For data to be transferred properly from core logic 12 to SerDes 14, it is important that the phase relationship between the first and second clock signals be within a specified range. The present invention can be included in association with the manufacture of IC 10, to test whether the phase relationship between the first and second clock signals is in fact within such a predetermined range.

It should be noted that FIG. 1 is not to scale, as SerDes 14 constitutes a much smaller portion of IC 10 than core logic 12. Although not shown in detail for purposes of clarity, core logic 12 includes the conventional "functional logic" that effects whatever the primary functions of IC 10 may be in a given embodiment of the invention. IC can have any suitable primary function or functions known in the art. For example, in an embodiment in which IC 10 is primarily a microprocessor, the functional logic effects the various functions that characterize the microprocessor. Indeed, in an application-specific IC (ASIC), the "application" comprises the function or functions. Accordingly, such functional logic forms the bulk of the logic of IC 10. One exemplary output register 16 of such functional logic or other logic of core logic 12 is shown for purposes of illustration as coupled to SerDes 14 for outputting data from IC 10, but it should be appreciated that there can be many other such registers that are coupled to SerDes 14 or other such SerDes (not shown) for the purpose of outputting data from IC 10. Likewise, one exemplary input register 18 of such functional logic or other logic of core logic 12 is shown for purposes of illustration as coupled to SerDes 10 for inputting data to IC 10, but it should be noted that there can be many other such registers that are coupled to SerDes 14 or other such SerDes for the purpose of inputting data to IC 10. The ellipses (". . .") included in the symbol representing registers 16 and 18 indicates that the register stores or holds a plurality of bits, i.e., stores a word having a width of two or more bits. For example, registers 16 and 18 can each be ten bits wide.

The serializer portion of SerDes 14 includes a register 20 that receives data (in parallel or non-serial format) from core logic 12, and serializing logic 22 that transforms such data into a serial bit stream and provides it to an output pad of IC 10. The de-serializer portion of SerDes 14 includes de-serializing logic 28 that transforms a serial-format data stream into a parallel-format data word, and a register 30 that receives that data word. The de-serializer portion of SerDes 14 operates in the same manner as that of the de-serializer portion of a conventional SerDes. That is, de-serializing logic 28 operates under a high-speed master clock to transform the data into parallel-format data words. Each of the first and second clocks (CLK_A and CLK_B in FIG. 1, respectively) has a frequency that is an integer fraction of the master clock frequency. For example, in an embodiment in which the first and second clock signals are 100 MHz, the master clock signal under which de-serializing logic 28 operates can be 1 GHz. As in a conventional SerDes, de-serializing logic 28 can detect data word boundaries by looking for and synchronizing itself with a predetermined data word pattern that the data word source transmits as a header preceding the informational data words. For example, in an embodiment in which data words are ten bits in width, the source can transmit a synchronization pattern consisting of three "0" bits and seven "1" bits: "0001111111" (or any other suitable pattern that the de-serializing logic can be pre-configured to recognize). Typically, to ensure synchronization, the source successively transmits such a data word pattern two or more times as a training sequence before transmitting informational data. De-serializing logic 28 can find the boundaries between successive words of this training sequence, thereby allowing it to de-serialize the informational data that may follow the training sequence into other 10-bit data words. As the de-serializer portion of SerDes 14 produces the data words, they are transferred from register 30 in SerDes 14 to register 18 in core logic 12. Note that registers 30 and 18 operate under yet another clock, produced by a divider 26 that divides the master clock by the above-described integer fraction. For example, divider 26 can be a divide-by-ten circuit, dividing a 1 GHz master clock down to 100 MHz.

SerDes 14 further includes multiplexing logic 24 that can selectably couple one of its several data inputs to its output. More specifically, in the illustrated embodiment multiplexing logic 24 has a control input and four data inputs: a first input (addressable through the control input as "0") coupled to an input pad of IC 10 for receiving serial-format data from an external source (not shown); a second input (addressable through the control input as "1") coupled to core logic 12 via the serializer portion for receiving serialized data in a loop-back manner for the above-described synchronization purposes or other suitable purposes; a third input (addressable through the control input as "2") coupled to the first clock signal; and a fourth input (addressable through the control input as "3") coupled to the second clock signal. In response to the address applied to the control input, multiplexing logic 24 selects one of its three inputs to couple to its output.

When IC 10 is not in the test mode described below, i.e., when it is in normal operational mode, SerDes 14 can receive data words from core logic 12, serialize the data, and transmit the serial-format data stream out of IC 10. Similarly, in normal operation, SerDes 14 can receive a serial-format data stream from a source external to IC 10, de-serialize the data, and provide the parallel-format data words to core logic 12. The normal operational mode is how the functional logic of IC 10 communicates (functional or informational) data, i.e., data relating to the functions that characterize IC 10 (for example, as a microprocessor or whatever its primary function or application may be in a given embodiment), with other devices. The arrows in FIG. 1 shown directed into the "D" inputs of register 16 and out of the "Q" outputs of register 18 (shown for purposes of illustration as comprising arrays of D-type flip-flops) are intended to represent such functional data flow in the normal operational mode.

Core logic 12 further includes control logic 32 and comparison logic 34 for operating in a clock phase relationship test mode. It should be noted that although in the exemplary embodiment control logic 32 and comparison logic 34 are included in core logic 12, in other embodiments such logic can alternatively be included in the SerDes or in any other suitable logic in IC 10 or external to IC 10. Note that in the normal operational mode, control logic 32 applies an address of "0" to multiplexing logic 24.

A clock phase relationship test can be performed at any suitable time, such as in conjunction with other post-production or wafer-level testing of IC 10. In the exemplary embodiment, control logic 32 effects the test steps, and communicates control signals accordingly with other elements involved in the test, as indicated in broken line in FIG. 1. Although not shown for purposes of clarity, control logic 32 can receive a signal from an external device (through suitable I/O communications) that causes control logic 32 to initiate the clock phase relationship test. Alternatively, the test can be initiated in any other suitable manner.

Figure 2:
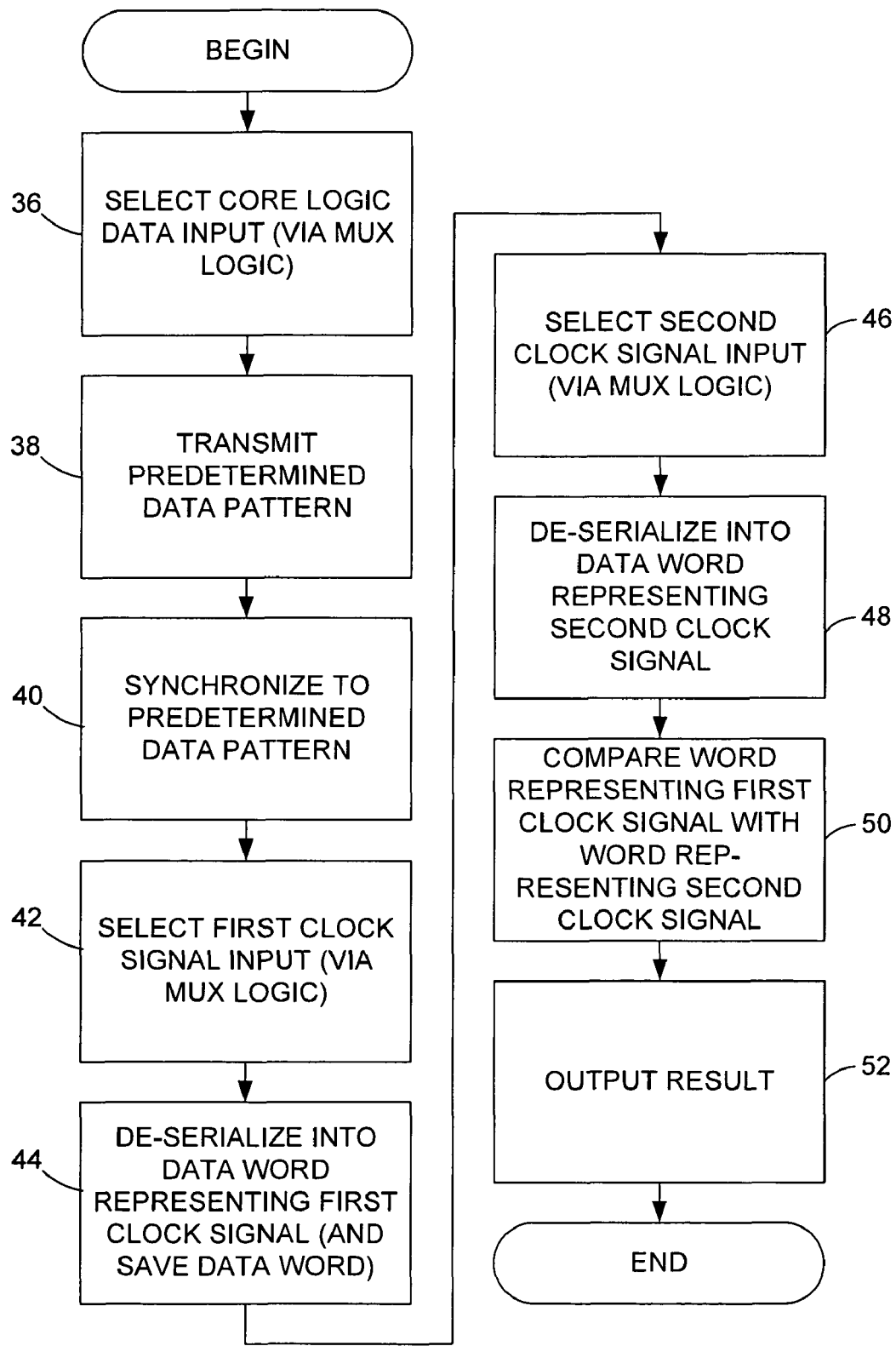
FIG. 2 is a flow diagram illustrating a method for testing clock phase relationships in the integrated circuit of FIG. 1.

As illustrated in FIG. 2, and with continuing reference to FIG. 1, in the test mode, control logic 32 can apply an address of "1" that causes multiplexing logic 24 to select the loopback path, thereby coupling the serializer output of SerDes 14 to the de-serializer input of SerDes 14, as indicated by step 36. Core logic 12 can then be used to transmit the above-described predetermined synchronization pattern, such as "0001111111", as indicated by step 38. As in a conventional SerDes, transmitting such a predetermined pattern one or more times causes de-serializing logic 28 to synchronize to that pattern, outputting a (parallel-format) data word, as indicated by step 40. For example, in an embodiment in which the data words are ten bits wide, after synchronizing to the 10-bit pattern, de-serializing logic 28 outputs a data word after every ten bits of incoming serial data.

Control logic 32 then applies an address of "2" to multiplexing logic 24 that causes multiplexing logic 24 to select the first clock signal input, as indicated by step 42. In response to switching multiplexing logic 24, the first clock signal passes through to de-serializing logic 28, which accordingly receives and transforms the first clock signal into a (parallel-format) data word, as indicated by step 44. The resulting data word representing the first clock signal is latched into register 30 and then transferred to register 18 in core logic 12. Comparison logic 34 saves or stores the data word representing the first clock signal.

Control logic 32 then applies an address of "3" to multiplexing logic 24 that causes multiplexing logic 24 to select the second clock signal input, as indicated by step 46. In response to switching multiplexing logic 24, the second clock signal passes through to de-serializing logic 28, which accordingly receives and transforms the second clock signal into a (parallel-format) data word, as indicated by step 48. The resulting data word representing the first clock signal is latched into register 30 and then transferred to register 18 in core logic 12.

As indicated by step 50, comparison logic 34 then compares the data word representing the second clock signal with the (previously saved) data word representing the first clock signal. A step 52 can be performed in which an indication of the result of the comparison is output. For example, it can be output from IC 10 to an external device (e.g., test equipment). Alternatively, the indication can be further processed in core logic 12. The indication can indicate the phase difference or, alternatively, only whether the test passed (i.e., the phase difference was within some predetermined threshold) or failed (i.e., the phase difference was not within the predetermined threshold). In most instances, it is desired for the first and second clock signals to have zero phase difference. If the first and second clock signals were to have zero phase difference, then step 52 would indicate that the corresponding data words match each other, i.e., are identical. After the test is completed, control logic 32 can return IC 10 to normal operational mode or pass control of this portion of IC 10 to other logic for further testing.

The above-described method can be further understood through the timing diagram of FIGS. 3A-C. Initially, control logic 32 applies an address of "1" to multiplexing logic 24, which responds by selecting the core logic data input. Core logic 12 transmits the synchronization pattern (in this example, as above, "0001111111"), which passes through to the multiplexing logic output (MUX OUT). De-serializing logic 28 synchronizes to the pattern and outputs it at time 54 as a (parallel-format) data word 56. Thereafter, de-serializing logic 28 outputs another data word every ten master clock cycles. In the illustrated example, as the pattern is transmitted twice, ten master clock cycles later, at time 58, de-serializing logic 28 again outputs the same data word 56'.

Then, a few master clock cycles after time 58, control logic 32 applies an address of "2" to multiplexing logic 24, which responds by selecting the first clock signal (CLK_A) input. For a few master clock cycles after this switching of multiplexing logic 24, its output (MUX OUT) is unstable or unpredictable, as indicated by "XXX". However, after this switching transition, the first clock signal appears at the multiplexing logic output (MUX OUT) as a repeating pattern of five "1" bits alternating with five "0" bits. This pattern reflects that the first clock signal is high for five "bit-times" (of the master clock) and low for five bit-times of the master clock.

Ten master clock cycles after time 58, de-serializing logic 28 outputs another data word 62, but data word 62 is unpredictable (indicated by "XXXXXXXXXX") because the multiplexing logic output was itself unstable or unpredictable during the switching transition of multiplexing logic 24. However, another ten master clock cycles later, at time 64, de-serializing logic 28 outputs the 10-bit portion of the first clock signal pattern that was captured or de-serialized during the previous ten master clock cycles. As the event of de-serializing logic 28 producing an output (at time 64) occurred between the fourth and fifth "0" bits of the first clock signal pattern, the resulting data word 66 output by de-serializing logic 28 begins with that fifth "0" bit: "0111110000". As described above with regard to step 44 (FIG. 2), comparison logic 34 saves this data word. Note that de-serializing logic 28 again outputs the same data word 66' ten master clock cycles later at time 68.

Note that control logic 32 need not switch multiplexing logic 24 at any precisely synchronized time. For example, several master cycles after time 68, control logic 32 applies an address of "3" to multiplexing logic 24, which responds by selecting the second clock signal (CLK_B) input. For a few master clock cycles after this switching of multiplexing logic 24, its output remains unstable or unpredictable, as indicated by "XXXX". However, after this switching transition, the second clock signal appears at the multiplexing logic output as the repeating pattern of five "1" bits alternating with five "0" bits. This pattern reflects that the second clock signal, like the first clock signal, is high for five bit-times and low for five bit-times.

Ten master clock cycles after time 68, de-serializing logic 28 outputs another data word 70 at time 72, but data word 70 is unpredictable, as is the data word 74 that is output still another ten master clock cycles later at time 76, because the multiplexing logic output was itself unstable or unpredictable during the switching transition of multiplexing logic 24. However, another ten master clock cycles later, at time 78, de-serializing logic 28 outputs the 10-bit portion of the second clock signal pattern that was captured or de-serialized during the previous ten master clock cycles. As the event of de-serializing logic 28 producing an output (at time 78) occurred between the second and third "0" bits of the second clock signal pattern, the resulting data word 80 output by de-serializing logic 28 begins with that third "0" bit: "0001111100". As described above with regard to step 50 (FIG. 2), comparison logic 34 compares this data word 80, representing the second clock signal, with the saved data word 66 representing the first clock signal.

The comparison is illustrated in FIG. 4. Note that data word 66 representing the first clock signal and data word 80 representing the second clock signal are not identical, indicating that there is some detectable (non-zero) phase difference or clock skew between them. Specifically, the corresponding bit transitions representing the clock edges are offset by two bit positions. In an embodiment in which the de-serializer portion of SerDes 14 operates at 1 GHz (as in the example described above), each bit-time is 1 ns. Therefore, an offset of two bit positions indicates that there is a 2 ns phase difference between the first clock signal and second clock signal.

One or more illustrative embodiments of the invention have been described above. However, it is to be understood that the invention is defined by the appended claims and is not limited to the precise embodiments described.

What is claimed is:

1. An integrated circuit, comprising:
  input/output (I/O) logic having output logic operating under a second clock signal to receive data from core logic to be output from the IC, the I/O logic including de-serializer logic, the de-serializer logic having multiplexing logic with a serial-format data input to receive data input to the IC, a first clock signal input, and a second clock signal input;
  clock phase test control logic coupled to a selector input of the multiplexing logic, the clock phase test control logic causing the multiplexing logic to select the first clock signal input, wherein the de-serializer logic produces parallel-format first clock data representing the first clock signal received from the multiplexing logic, and the clock phase test control logic causing the multiplexing logic to select the second clock signal input, wherein the de-serializer logic produces parallel-format second clock data representing the second clock signal received from the multiplexing logic; and
  comparison logic coupled to the de-serializer logic, the comparison logic comparing the parallel-format first clock data with the parallel-format second clock data in a bitwise comparison to determine clock signal transition differences represented by bit differences between the parallel-format first clock data and the parallel-format second clock data.

2. The integrated circuit claimed in claim 1, wherein:
  the de-serializer logic is a de-serializer portion of a Serializer/De-serializer (SerDes), and the multiplexing logic has a serial-format data input to receive data input to the IC, a first clock signal input, a second clock signal input, and a loopback data input coupled to the core logic via a serializer portion of the SerDes; and
  the de-serializer portion of the SerDes synchronizes itself to a synchronization pattern received from the core logic via the serializer portion of the SerDes.

3. The integrated circuit claimed in claim 1, wherein the comparison logic is included in the core logic.

* * * * *